Oct. 6, 1942.  J. V. MARTIN  2,298,142
UNITARY SPOKE AND TREAD TIRE
Filed Feb. 17, 1940  4 Sheets-Sheet 1

INVENTOR,
James V. Martin

INVENTOR
James V. Martin

Oct. 6, 1942.  J. V. MARTIN  2,298,142
UNITARY SPOKE AND TREAD TIRE
Filed Feb. 17, 1940  4 Sheets-Sheet 3

INVENTOR,
James V. Martin

Oct. 6, 1942. J. V. MARTIN 2,298,142
UNITARY SPOKE AND TREAD TIRE
Filed Feb. 17, 1940  4 Sheets-Sheet 4

INVENTOR,
James V. Martin

Patented Oct. 6, 1942

2,298,142

UNITED STATES PATENT OFFICE 2,298,142

UNITARY SPOKE AND TREAD TIRE

James V. Martin, Milton, N. Y.

Application February 17, 1940, Serial No. 319,539
In Great Britain April 25, 1939

9 Claims. (Cl. 152—7)

The primary object of my invention is to provide a safer and easier riding type of tire than those heretofore disclosed and to provide improved methods of molding the same.

A further object of my invention is to improve the constructions shown in my former Patents Nos. 2,016,095; 2,050,352 and my copending applications Serial No. 27,603, filed June 20, 1935; Serial No. 86,874, filed June 23, 1936, and Serial No. 236,103, filed Oct. 20, 1938.

Further objects of my invention are to simplify the tires of the resilient spoke type both as constructions having less parts and also as to making it possible to mold the tire tread and spokes in a single cure. A still further object of my invention is to provide for greater molding pressure at certain critical places than would be needed for other places within the mold.

With the foregoing as the broad objectives of the invention further objects will be disclosed as we proceed with a detailed description of the drawings.

Figure 4:
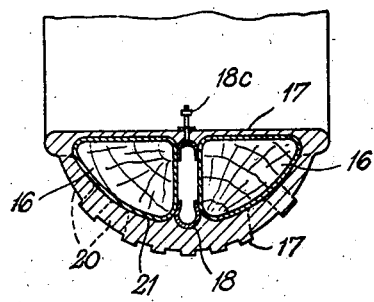
Fig. 4 is a view in section taken along the line IV—IV of Fig. 1.
Figure 5:
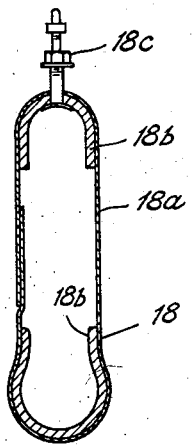
Fig. 5 is an enlarged view in section of the inflated spacer tube 18 seen in the central lower portion of Fig. 4.
Figure 6:
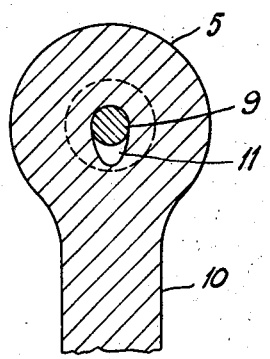
Fig. 6 is an enlarged view in section taken along the line VI—VI of Fig. 2.
Figure 14:
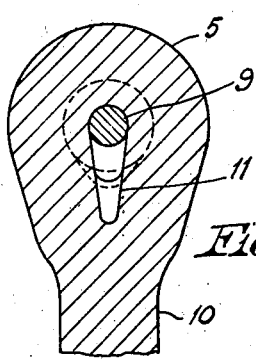
Fig. 14 shows in section an alternative spoke loop form.
Figure 7:
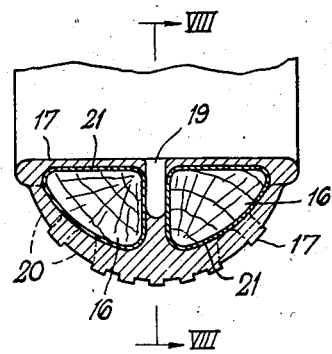
Fig. 7 is a view in section taken along the line VII—VII of Fig. 3.
Figure 8:
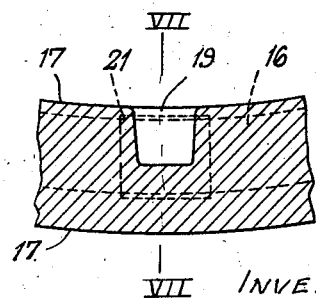
Fig. 8 is a view in section taken along the line VIII—VIII of Fig. 7.
Figure 9:
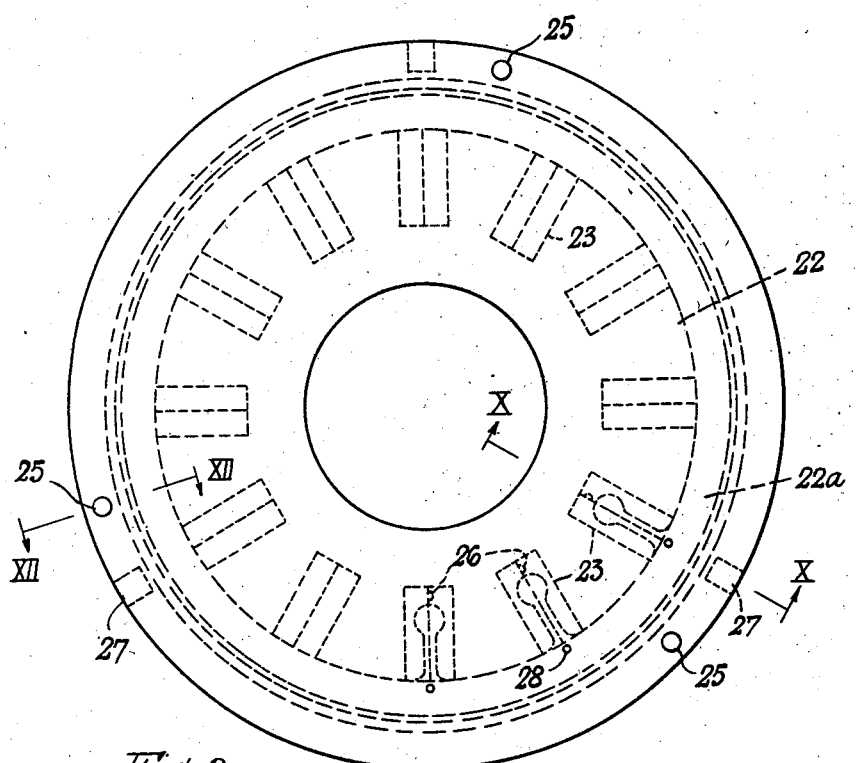
Fig. 9 is a view looking down upon my new type of mold and indicating in dotted lines the apertures for molding a tire such as is shown in Fig. 1.
Figure 11:
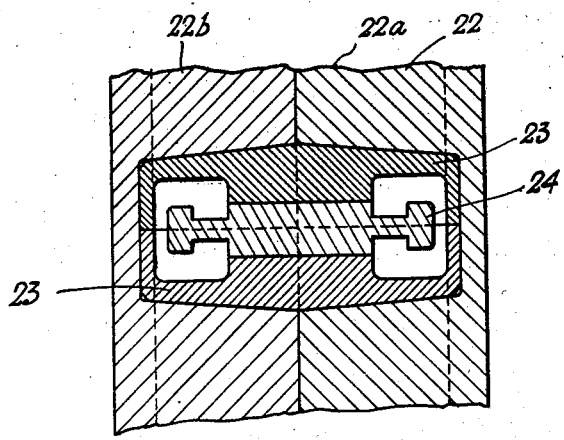
Fig. 11 is a view in section taken along the line XI—XI of Fig. 10.

Proceeding now with the still more detailed description of the invention similar numerals will be employed to designate similar features throughout the several views: 1 indicates the typical hub of a motorcycle type wheel and 2 the spokes interposed between the said hub and the wheel rim 3. 4 indicates a button headed wheel rim pin, the ends of which form spoke attachments adapted to fit snugly within molded sockets in the inward lugs 5 of the rubber spokes 10. 6 indicates the button head of the rim pin 4 which is shown as a portion of a piece of metal press fitted into a steel tube 7 and having a pin 8 to additionally secure it in place. The said metal has a turned neck 9 of smaller diameter than any other portion of the rim pin 4 as indicated, see Fig. 2. 11 indicates an open space below the neck 9 of the pin 4 on the right hand side of Fig. 2 and in Fig. 6, while 11' indicates an alternative space by means of dotted lines in Fig. 2 and more clearly in Fig. 14 by the V-shaped slots seen therein. 10 indicates one of the rubber spokes under initial tension and 12 shows one of the portions of the spoke thickened into a cross rib of the spoke for lateral strength of the tire. 13 indicates the thin or web portion of a spoke, while 14 designates the curved bead at the edges of the spoke on each side. 15 designates the tread hoop portion of my novel tire which contains two hickory wood filler hoops 16 cured to and within a complete rubber envelope 17 and these are spaced apart during molding operation and later by an inflated inner tube built up of an envelope 18a (see Fig. 5) having reinforcing pieces 18b where the backing during molding would not be resistant to inflation as the wood filler 16 is and the tube 18 is provided with an air inflating valve 18c. As an alternative for holding the two filler hoops 16 apart from each other during the molding operation I show a space 19 created in the tire tread portion during molding operations by a metal spacer (not shown), which can be varied in size to create the amount of space desired between the hoops 16. For example if a comparatively large degree of relative vertical movement is desired between the wood fillers 16 then the spacing metals which produce the molded apertures 19 (see Figs. 7 and 8) should be as large as practical. It will be noticed that the spacer which produces the opening 19 keeps the hoops 16 apart during molding while metal lugs 20' in the mold (see Figs. 10 and 12) center the hoops from the outer sides of the mold: This centering, or correct spacing of the wood fillers 16 is arranged so as to provide a skin of rubber over the wood at all places even at those places where the mold lugs 20' press inwardly. This is accomplished by wrapping cotton or other gum impregnated tape around the hoops at suitable intervals, see 21, in Figs. 4, 7 and 8 and see the skin of resulting rubber at the base of the grooves 20 in Fig. 2.

Now turning to the special mold 22, Figs. 9 to 13 inclusive, for molding the elastic spoke tires, 22 is the top of the flat plate mold and 22b the bottom thereof: 23 indicates similar, but oppositely placed molding plates to form the spokes 10 of the tire, but notice the proportionate shorting of these spokes as represented by their molding plates 23: This difference amounts to the initial tension desired in the spokes and can be regulated after the tire is molded by altering the diameter of the vehicle rim 3 to which the spokes are to be attached. 24 indicates the molding pin which produces the spaces and button headed sockets for the pin 4 seen in Figs. 2 and 3. 25 is an extra long guide pin for registering the upper half of the mold when it is lowered over the loaded lower half. 26 indicates conveniently placed overflow spaces for surplus rubber and 27 a wedging space for a tool to force the mold halves apart after the cure and 28 shows an air trap vent.

The operation of my tire will be evident to those skilled in the pertinent art: The amount of flexing desired in the tire tread portion can be regulated by the dimensions of the hoop fillers 16 and by the compounds and initial tensions used for the spokes 10.

The lateral strength of the tire can be regulated by altering the thickness and/or the angle of the cross ribs 12 of the spokes.

Figure 1:
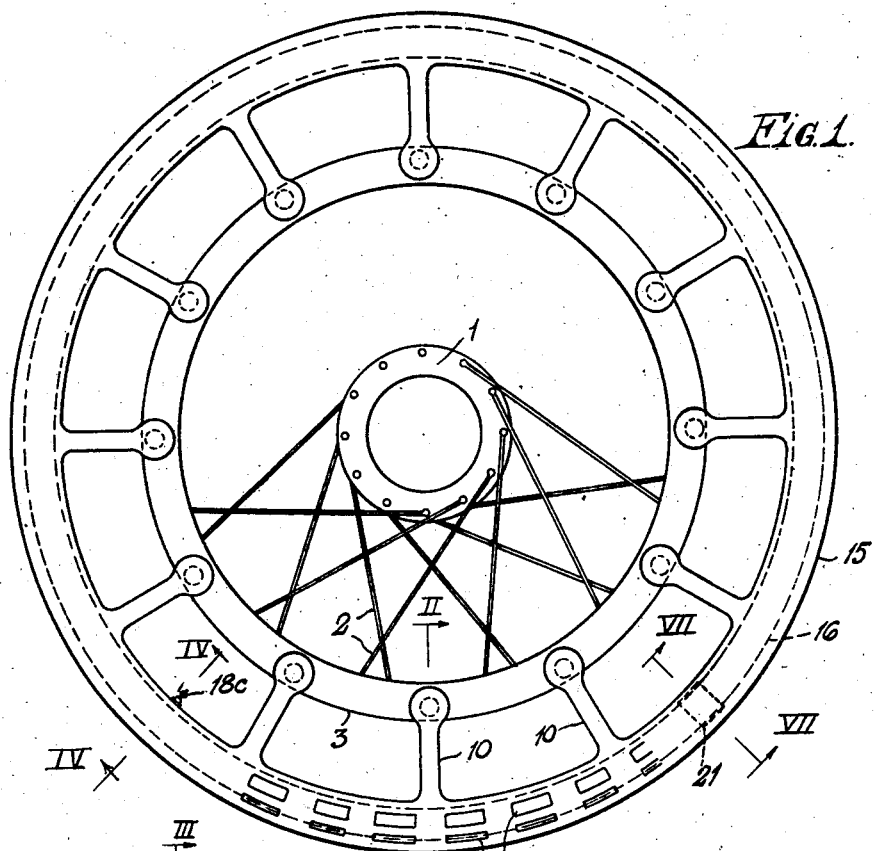
Fig. 1 is a view in side elevation of my invention as it would appear mounted upon the rim of a typical motorcycle steel spoke wheel.
Figure 2:
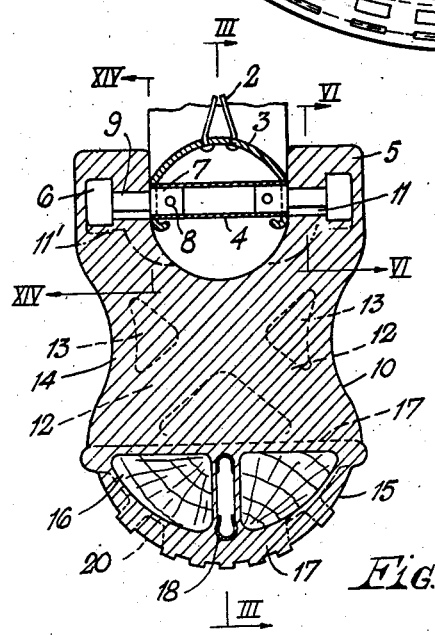
Fig. 2 is a view in section of my invention taken along the line II—II of Fig. 1.
Figure 3:
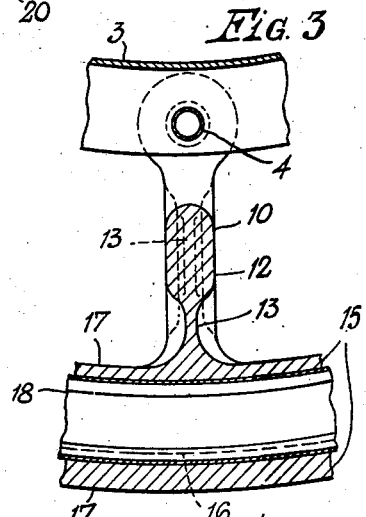
Fig. 3 is a view in section taken along the line III—III of Fig. 2.

It is most important for the easiest riding to prevent any load passing upwardly from the road to the axle through compression of one or more spokes and my device for preventing that, in the present tire, is the space 11 or 11' which is provided by means of shape and proportions given the molding pin 24. The space 11 also greatly facilitates assembly of the spoke sockets onto the button heads 6 of the spokes 10. By using soap-water over the ends of pin 4 the assembly of the spokes to the wheel rim by hooking their inner ends over the attachment ends can also be aided. Instead of a valve for inflating the spacing tube 18, gas capsules can be used as is practice in making rubber balls. Lightness and easy displacement vertically for the tread is accomplished by having a comparatively large space between the hickory hoops 16 as shown in Fig. 2, but almost this amount of open space can be produced by using larger metal spacing pieces such as indicated in small size but not shown in Figs. 7 and 8, at 19. The thickness desired as minimum rubber over the wood fillers 16 at the bottoms of the centering grooves 20 can be determined by the compressed thickness of the cotton tape 21 wrapped around the hoops 16.

It will be observed that a comparatively round tread contour in cross-section is had in this type tire for the first time and not only does this add to the tire's appearance, but it enables a motorcycle to bank readily. The laterally protruding bead, Fig. 2, on 15 adjacent 10 is continuous and protects the spokes from contacts.

Figures 10, 12:
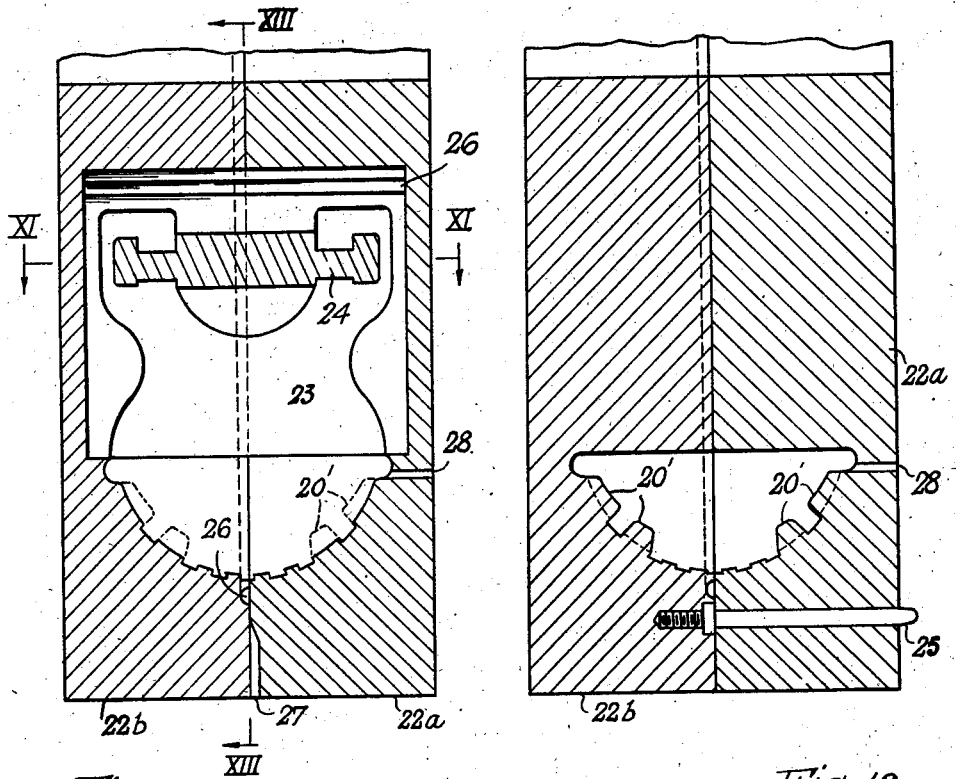
Fig. 10 is a view of my new type mold in section taken along the line X—X of Fig. 9 and to an enlarged scale.
Fig. 12 is a view in section taken along the line XII—XII of Fig. 9.

To mold my unitary spoke and tread tire the compound to be cured is placed in appropriately sized strips in the preheated mold and the portion on the left cavity 22b as seen in Fig. 12 is packed with the filler 16 in place (see Fig. 7); then the metal spacers formed to produce the cavities 19 in the tire or else the tube 18 are placed in position: The next step is to load the spoke plates 23 and insert the tapered ends of these plates pressed together into the openings thereof in 22b, see Figs. 9 and 11: Then pack the upper half 22a of the mold with its filler 16 and the compound and lower over 22b with registering pins 25 to guide until the upper tapers of 23 enter their respective chambers in 22a.

Figure 13:
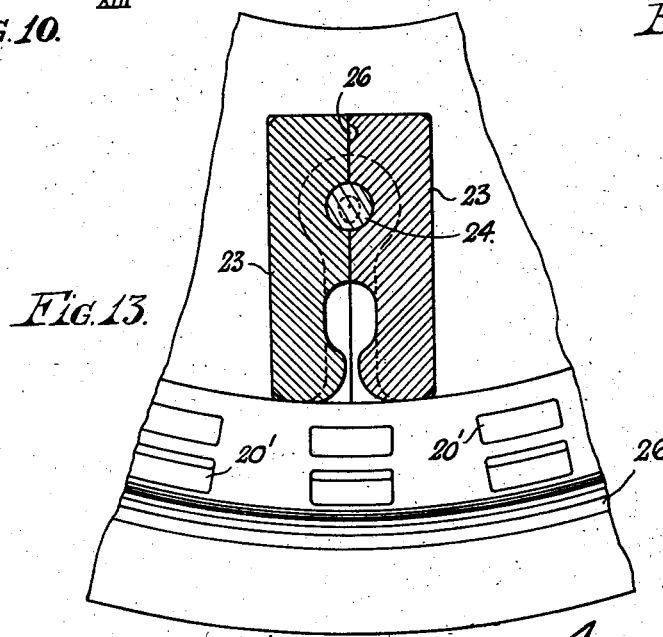
Fig. 13 is a view, partly in section taken along the line XIII—XIII of Fig. 10.

Pressure and heat may now be applied gradually and it will be noticed that because of the tapered form of the back portions of the molding plates 23 and their corresponding apertures in the molds extra pressure will be given the rubber to form a bond with the tread rubber where the spoke expands, see Fig. 13.

With this type of molding which I have found satisfactory in practice an elastic spoke tire may be produced without any connecting pins between the spokes and tread hoops. While I have shown and described a preferred embodiment of my invention various changes and adaptations may be readily made without departing from my teachings and what I claim as my invention particularly is:

1. In an elastic spoke and flexible tread type tire, a wheel rim to carry the wheel loads to the said tread through the upper half of the said spokes in tension and means located in each spoke to attach same to the said rim and to prevent any substantial load from passing through compression of a spoke from the said rim to the said tire tread.

2. A combination according to claim 1 and the said means including open spaces in the said spokes on one side of the said attachment.

3. A combination according to claim 1 and a button ended pin forming the said attachment between the said wheel rim and the inner ends of the said spokes and open spaces molded into the said spokes on the outer side of the said pin attachment.

4. In combination with an elastic spoke type tire. a flexible tread portion for the said tire, a wheel rim carrying transversely disposed spoke attachments having expanded ends and slotted openings molded into the inner ends of the said spokes whereby when the same are assembled onto the said attachments a substantial movement of the said spokes can take place on the said attachments before any compression load can be transmitted through the said spokes.

5. A vehicle wheel rim and tire combination including elastic spokes cured to a rubber tread envelope and assembled to the said rim with initial tension in each spoke and a connection betwene the said rim and each spoke adapted to prevent compression loads passing through any of the said spokes.

6. A tire tread portion for a vehicle tire including multiple fillers bonded to and within a tread envelope and separated from each other by an air space.

7. A combination according to claim 6 and an inflated tube located in the said air space.

8. In combination with a wheel rim, a tire including elastic spokes under initial tension and a flexible tread hoop, transversely extending attachments located on and forming part of the said rim, sockets molded into the said spokes and the said sockets adapted to fit over the said attachments, and open spaces in the said spokes and being continuations of the said sockets whereby upon relaxation of the said tension a spoke so relaxed will not transmit a load in compression from the said rim to the said hoop.

9. In an elastic spoke tire having an arcuate ground contacting portion with stiffening hoops embedded therein, each of said stiffening hoops being of substantially triangular cross-section and having an arcuate surface substantially parallel to the ground contacting portion.

JAMES V. MARTIN.